(12) United States Patent
Mishra et al.

(10) Patent No.: US 11,562,062 B1
(45) Date of Patent: Jan. 24, 2023

(54) SUPPORTING MULTIPLE AUTHENTICATION METHODS ON A PORT OF A NETWORK DEVICE AT THE SAME TIME

(71) Applicant: Juniper Networks, Inc., Sunnyvale, CA (US)

(72) Inventors: Subha Sankar Mishra, Bangalore (IN); Nandan Debnath, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 600 days.

(21) Appl. No.: 16/573,379

(22) Filed: Sep. 17, 2019

(51) Int. Cl.
*G06F 21/45* (2013.01)
*H04L 9/40* (2022.01)

(52) U.S. Cl.
CPC .............. *G06F 21/45* (2013.01); *H04L 63/08* (2013.01)

(58) Field of Classification Search
CPC ................................ G06F 21/45; H04L 63/08
USPC .............................................................. 726/6
See application file for complete search history.

(56) References Cited

U.S. PATENT DOCUMENTS

| 2008/0013481 | A1* | 1/2008 | Simons | H04W 12/08 |
| | | | | 370/328 |
| 2016/0087954 | A1* | 3/2016 | Zhang | H04W 12/06 |
| | | | | 726/6 |

OTHER PUBLICATIONS

IEEE Standard for Local and metropolitan area networks IEEE Std 802.1X-2010 (Year: 2010).*
What is the captive portal and how does it work with my managed switch? https://kb.netgear.com/22006/What-is-the-captive-portal-and-how-does-it-work-with-my-managed-switch Jan. 28, 2016 (Year: 2016).*
IEEE 802.1X Multiple Authentication https://www.cisco.com/en/US/docs/ios-xml/ios/sec_usr_8021x/configuration/15-2mt/sec-ieee-802x-multi-auth.html ©2012 Cisco Systems, Inc. (Year: 2012).*

* cited by examiner

*Primary Examiner* — Benjamin A Kaplan
(74) *Attorney, Agent, or Firm* — Harrity & Harrity, LLP

(57) ABSTRACT

A network device may receive, via a single port of the network device, a connection request from a user device and may obtain, based on the connection request, information related to an authentication history of the user device. The network device may determine, based on the information related to the authentication history of the user device, an authentication method to be used by the network device to authenticate the user device and may determine, using the authentication method, that the user device is authenticated. The network device may establish, based on determining that the user device is authenticated, an authenticated communication session with the user device on the single port of the network device. The network device may determine, using an additional authentication method, that an additional user device is authenticated and may establish an additional authenticated communication session with the additional user device on the single port.

20 Claims, 15 Drawing Sheets

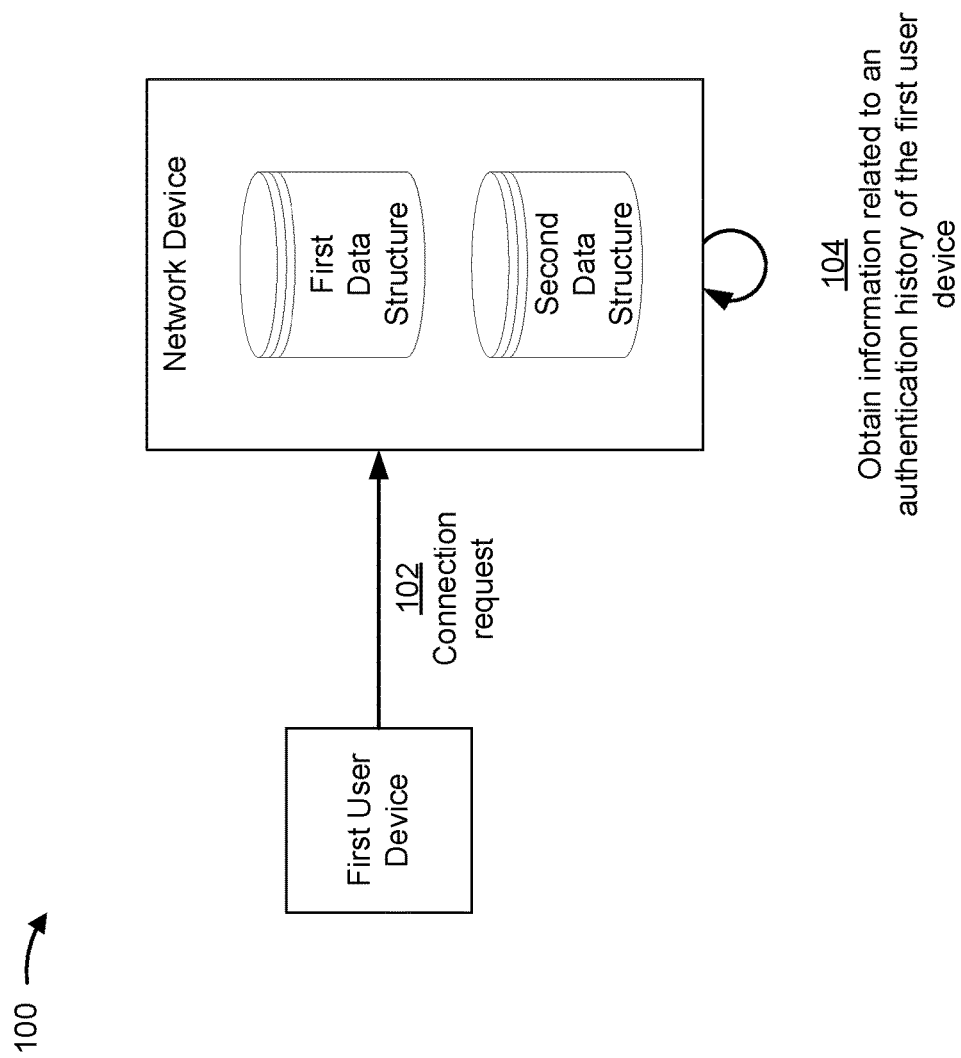

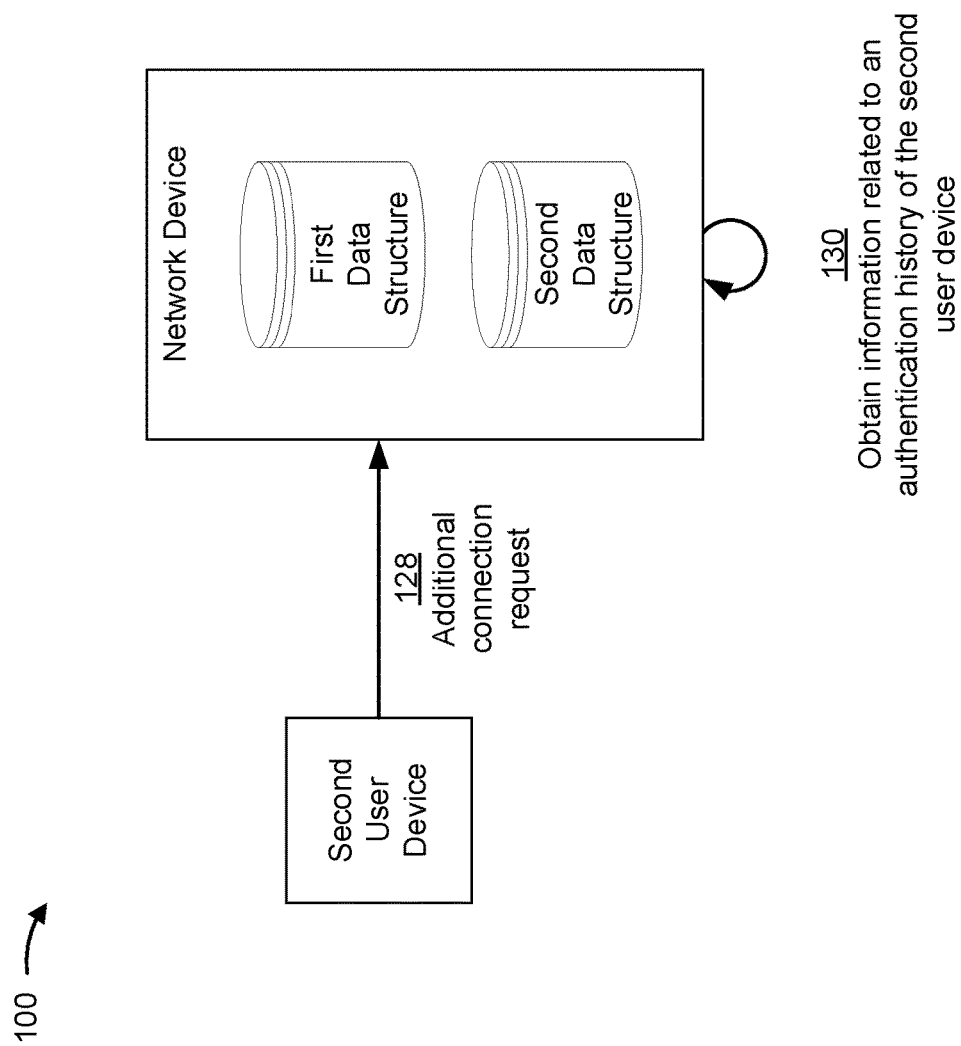

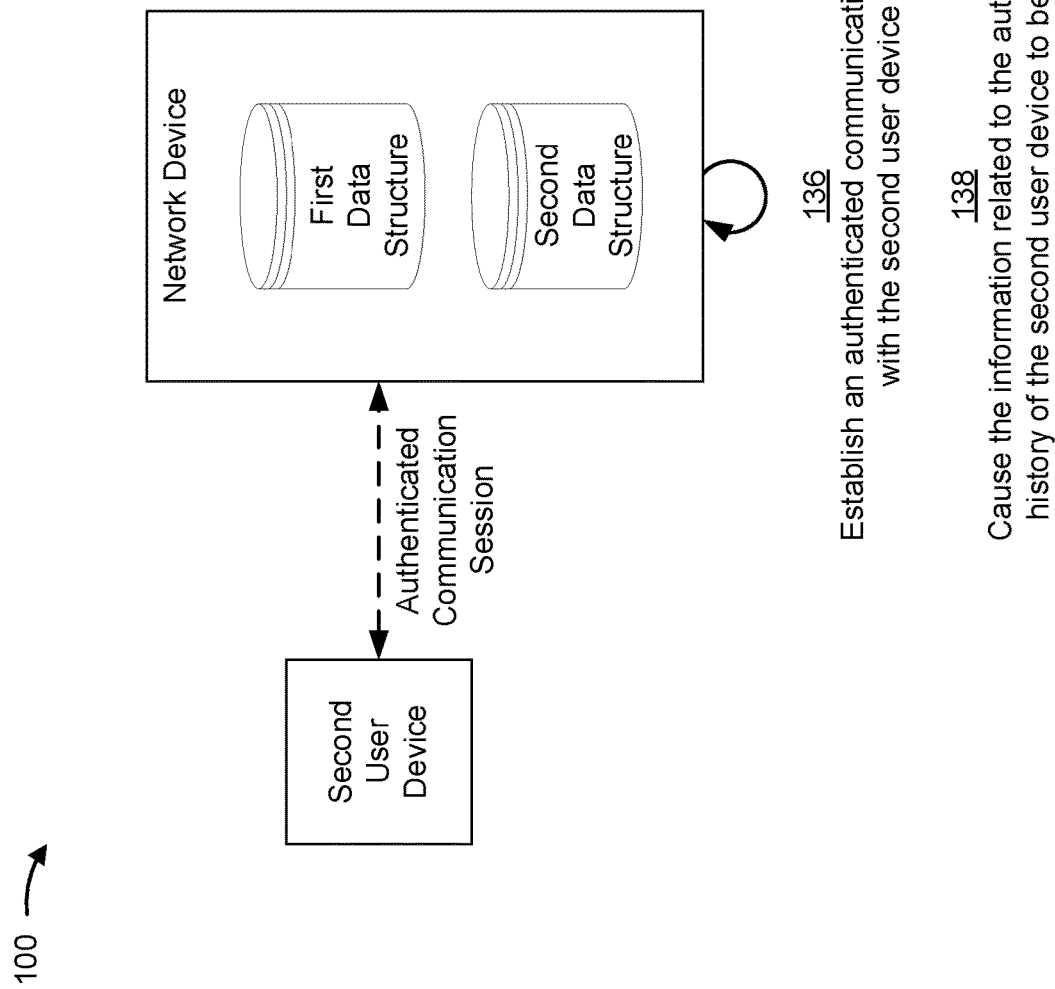

SUPPORTING MULTIPLE AUTHENTICATION METHODS ON A PORT OF A NETWORK DEVICE AT THE SAME TIME

BACKGROUND

Computing and communication networks typically include network devices, such as routers, firewalls, switches or gateways, which transfer or switch data, such as packets, from one or more sources to one or more destinations. A network device may also support an authentication method to facilitate authenticating a user device that connects to the network device.

SUMMARY

According to some implementations, a method may include receiving, by a network device and via a single port of the network device, a connection request from a user device; obtaining, by the network device and based on the connection request, information related to an authentication history of the user device from a data structure; determining, by the network device and based on the information related to the authentication history of the user device, an authentication method to be used by the network device to authenticate the user device; generating, by the network device and based on the authentication method, an authentication request; sending, by the network device and via the single port of the device, the authentication request to the user device; receiving, by the network device and via the single port of the device, an authentication response from the user device; determining, by the network device and based on the authentication response and the authentication method, that the user device is authenticated; establishing, by the network device and based on determining that the user device is authenticated, an authenticated communication session with the user device on the single port of the network device; and causing, by the network device and based on determining that the user device is authenticated, the information related to the authentication history of the user device to be updated in the data structure.

According to some implementations, a network device may include one or more memories, and one or more processors to: receive, via a single port of the network device, a connection request from a user device; obtain, based on the connection request, information related to an authentication history of the user device; determine, based on the information related to the authentication history of the user device, a first authentication method to be used by the network device to authenticate the user device; determine, using the first authentication method, that the user device is not authenticated; determine, based on determining that the user device is not authenticated, a second authentication method to be used by the network device to authenticate the user device; determine, using the second authentication method, that the user device is authenticated; and establish, based on determining that the user device is authenticated, an authenticated communication session with the user device on the single port of the network device.

According to some implementations, a non-transitory computer-readable medium may store one or more instructions. The one or more instructions, when executed by one or more processors of a device, may cause the one or more processors to: receive, via a single port of the device, a first connection request from a first user device and a second connection request from a second user device; obtain, based on the first connection request, information related to an authentication history of the first user device; determine, based on the information related to the authentication history of the first user device, a first authentication method to be used by the device to authenticate the first user device; obtain, based on the second connection request, information related to an authentication history of the second user device; determine, based on the information related to the authentication history of the second user device, a second authentication method to be used by the device to authenticate the second user device, wherein the first authentication method and the second authentication method are different; determine, using the first authentication method, that the first user device is authenticated; determine, using the second authentication method, that the second user device is authenticated; establish, based on determining that the first user device is authenticated, a first authenticated communication session with the first user device on the single port of the device; and establish, based on determining that the second user device is authenticated, a second authenticated communication session with the second user device on the single port of the device.

BRIEF DESCRIPTION OF THE DRAWINGS

FIGS. 1A-1I are diagrams of example implementations described herein.

DETAILED DESCRIPTION

Figure 1B:
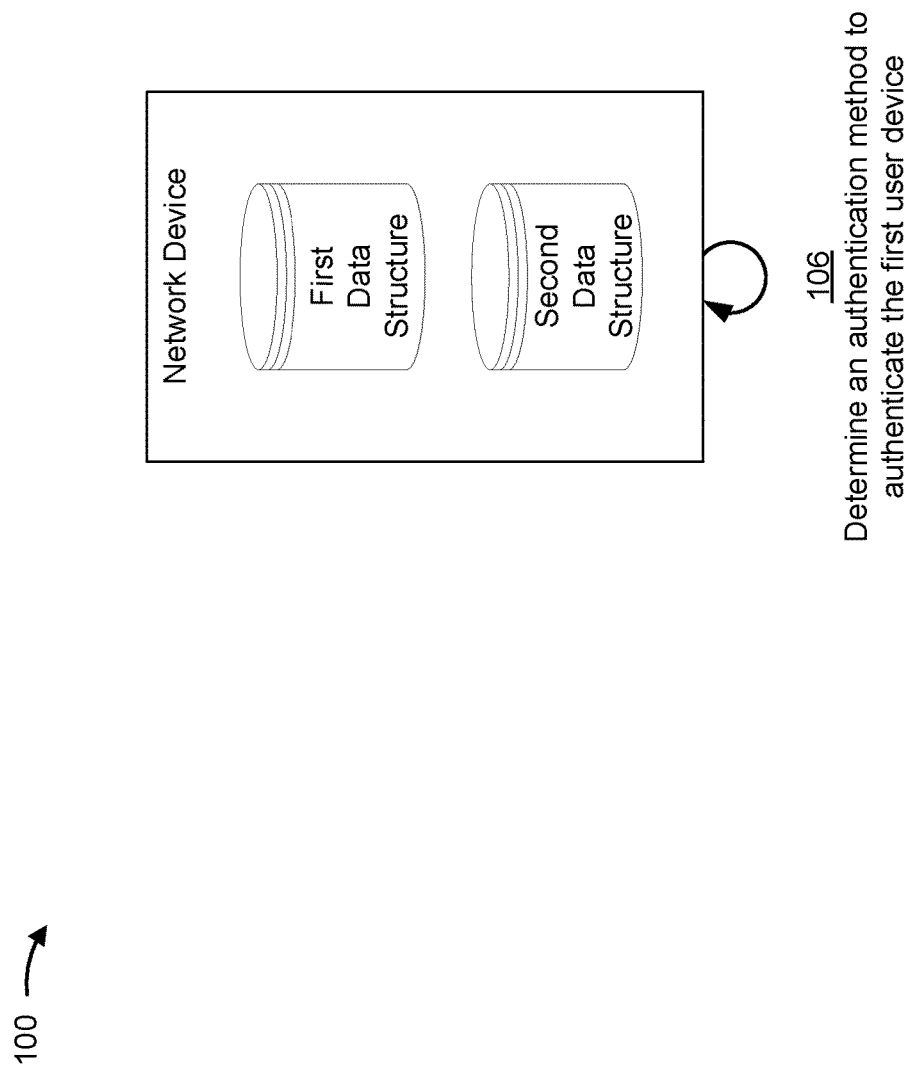

The following detailed description of example implementations refers to the accompanying drawings. The same reference numbers in different drawings may identify the same or similar elements.

A user device may attempt to access a network by connecting to a port of a network device included in the network. In many cases, the network device may attempt to authenticate the user device to ensure that access to the network is granted to only authorized devices. The network device may be able to use one or more authentication methods (e.g., a web-based authentication method, an Institute of Electrical and Electronics Engineers (IEEE) 802.1x authentication method, and/or the like) to authenticate the user device. Often, however, the network device is able to implement only one particular authentication method on the port at any moment in time (e.g., a duration of seconds, minutes, hours, and/or the like). Therefore, any user device that connects to the network device via the port during the moment in time must support the particular authentication method in order to be able to be authenticated by the network device. Accordingly, this can prevent some user devices that do not support the particular authentication method from being able to connect to the network device via the port during the moment in time, even if the network device would be able to authenticate the user device using a different authentication method that is supported by the user device and the network device. This may prevent some user devices from connecting to the network device and/or from accessing the network. Moreover, some user devices may wait for the moment of time to cease (e.g., to allow the network device to select the different authentication method to implement on the port), which may increase a wait time and/or latency associated with connecting to the network for the user device.

Some implementations described herein allow a network device to support different authentication methods on a port of a network device at the same time or at substantially the same time. In some implementations, the network device may receive (e.g., at the same time or at substantially the same time) via a single port of the device, a first connection request from a first user device and a second connection request from a second user device. In some implementations, the network device may determine a first authentication method to be used by the network device to authenticate the first user device and a second authentication method to be used by the network device to authenticate the second user device. In some implementations, the first authentication method and the second authentication method may be different. In some implementations, the network device may determine, using the first authentication method, that the first user device is authenticated and may determine, using the second authentication method, that the second user device is authenticated. Accordingly, in some implementations, the network device may establish a first authenticated communication session with the first user device on the single port of the device and a second authenticated communication session with the second user device on the single port of the device.

In this way, the network device is able to authenticate one or more user devices based on a respective authentication capability of the one or more user devices (e.g., an authentication method respectively supported by the one or more user devices) rather than an authentication capability of a single port of the network device. This may allow the network device to authenticate more user devices that connect to the network device via the single port at the same time or at substantially the same time. Moreover, this may prevent delays and latency involved with authenticating particular user devices.

FIGS. 1A-1I are diagrams of one or more example implementations 100 described herein. As shown in FIGS. 1A-1I, example implementation(s) 100 may include a network device, a first user device, a second user device, and/or a server device. The network device may include various types of devices, such as a router, a gateway, a switch, a bridge, a wireless access point, a base station, a spine, a firewall, and/or the like. The network device may include one or more ports for communicating with the first user device, the second user device, and/or the server device. The network device may be included in a network, such as a cellular network, a local area network (LAN), a core network, an access network, a wide area network (WAN) such as the Internet, a cloud network, and/or the like.

As shown in FIG. 1A and by reference number 102, the network device may receive a connection request from the first user device. The network device may receive the connection request from the first user device via a single port of the one or more ports. For example, the first user device may connect to the single port and send a transmission control protocol or internet protocol (TCP/IP) connection request to the network device (e.g., to access the network). The connection request may include a media access control (MAC) address associated with the first user device, an IP address associated with the first user device, a device identifier associated with the first user device, information associated with a user of the first user device (e.g., a username), and/or the like.

As shown by reference number 104, the network device may obtain information related to an authentication history of the first user device. For example, the network device may process (e.g., parse) the connection request to determine identification information concerning the first user device, such as the MAC address associated with the first user device, the IP address associated with the first user device, the device identifier associated with the first user device, the information associated with the user of the first user device, and/or the like. The network device may query, based on the identification information, a first data structure for the information related the authentication history of the first user device. The first data structure may be included in the network device or may be accessible to the network device via the network. The information related to the authentication history of the first user device may indicate and/or identify whether the network device, or a different device (e.g., a different network device), has previously authenticated the first user device and may indicate and/or identify a previously used authentication method that was used (e.g., by the network device or the different device) to authenticate the first user device.

As shown in FIG. 1B and by reference number 106, the network device may determine an authentication method to be used by the network device to authenticate the first user device. For example, the network device may process (e.g., parse) the information related to the authentication history of the first user device to identify and/or determine the previously used authentication method that was used (e.g., by the network device or the different device) to authenticate the first user device. The network device may select the previously used authentication method as the authentication method to be used by the network device to authenticate the first user device.

In another example, the network device may process (e.g., parse) the information related to the authentication history of the first user device to identify and/or determine that the network device and/or the different device have not previously authenticated the first user device. The network device therefore may obtain information identifying a default authentication method (sometimes referred to as an initial authentication method) from a second data structure. The network device may select the default authentication method as the authentication method to be used by the network device to authenticate the first user device.

The second data structure may store information that indicates a rank order of one or more authentication methods (e.g., with the default authentication method having the highest rank). The second data structure may be included in the network device or may be accessible to the network device via the network. In some implementations, the second data structure may include or be part of the first data structure.

In some implementations, the authentication method is a web-based authentication method (e.g., a captive portal web-based authentication method), an Institute of Electrical and Electronics Engineers (IEEE) 802.1x authentication method (e.g., an extensible authentication protocol over local area network (EAPoL) authentication method), a MAC-based authentication method (e.g., a MAC authentication bypass (MAB) authentication method, a MAC-radius authentication method, and/or the like), and/or the like.

Figure 1C:
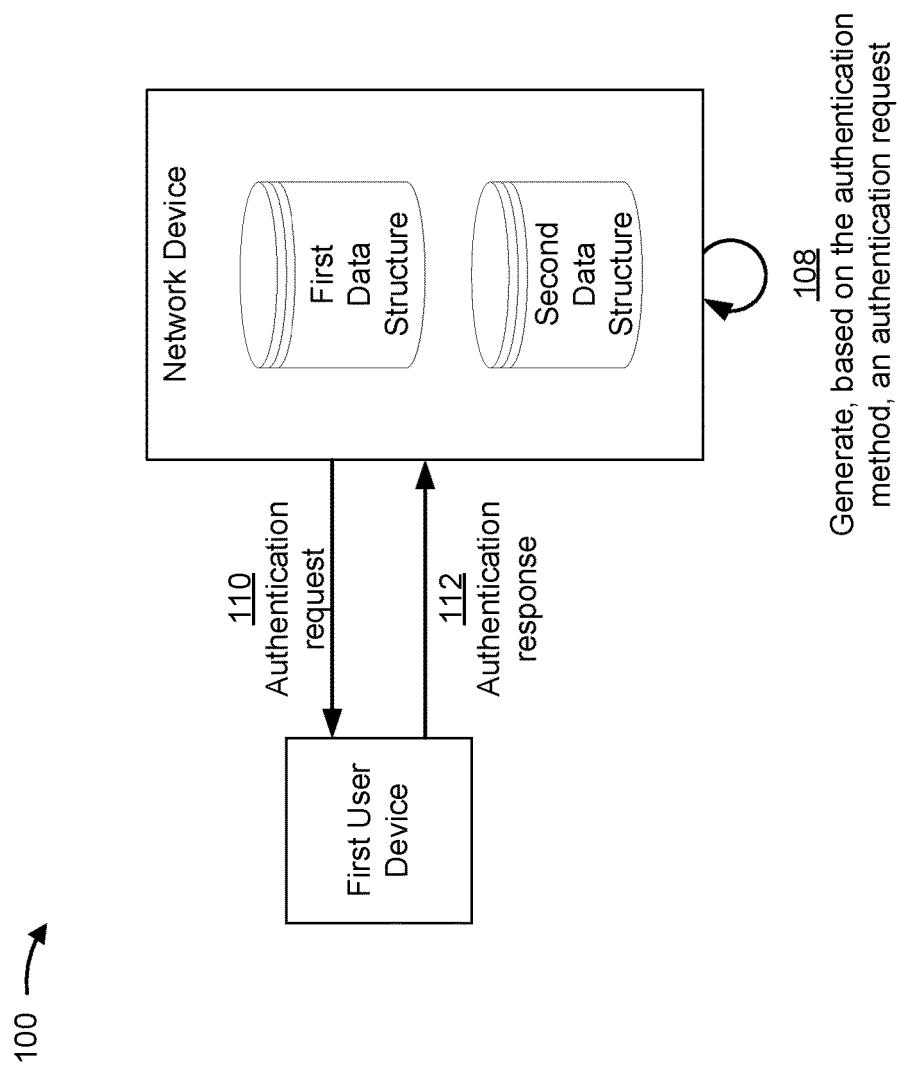
Figure 1D:
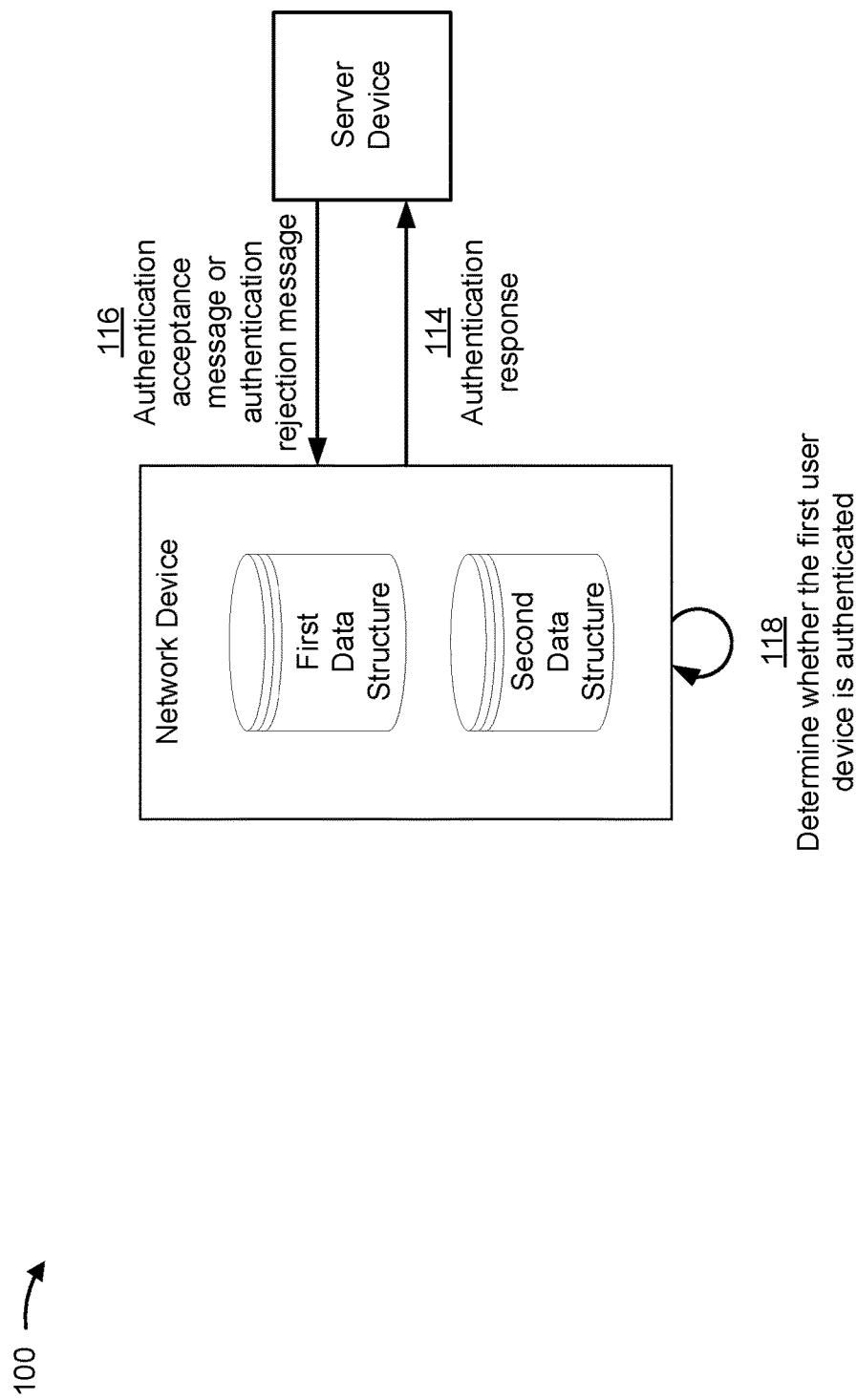

In some implementations, the network device may communicate, based on the authentication method, with the first user device and/or the server device to attempt to authenticate with the first user device, as described herein in relation to FIGS. 1C and 1D.

As shown in FIG. 1C and by reference number 108, the network device may generate an authentication request (e.g., based on the authentication method). For example, when the authentication method is a captive portal web-based authentication method, the authentication request may be a captive portal authentication request. As another example, when the authentication method is an EAPoL authentication method, the authentication request may be an EAPoL authentication request. The authentication request may be a request for authentication credentials of the first user device and/or of a user of the first user device.

As shown by reference number 110, the network device may send the authentication request to the first user device via the single port of the network device. As shown by reference number 112, the network device may receive, after sending the authentication request and via the single port of the network device, an authentication response from the first user device. The authentication response may include the authentication credentials of the first user device and/or of the user of the first user device.

As shown in FIG. 1D and by reference number 114, the network device may send the authentication response to the server device. The server device may be an authentication server device, such as a remote authentication dial in user service (RADIUS) server device or a similar device, that processes the authentication response to determine whether the authentication credentials are accepted or rejected. As shown by reference number 116, the network device may receive, after sending the authentication response, an authentication acceptance message (e.g., indicating that the authentication credentials are accepted) or an authentication rejection message (e.g., indicating that the authentication credentials are rejected).

As shown by reference number 118, the network device may determine whether the first user device is authenticated. For example, the network device may determine that the first user device is authenticated based on the authentication acceptance message received from the server device. In a different example, the network device may determine that the first user device is not authenticated based on the authentication rejection message received from the server device.

Figure 1E:
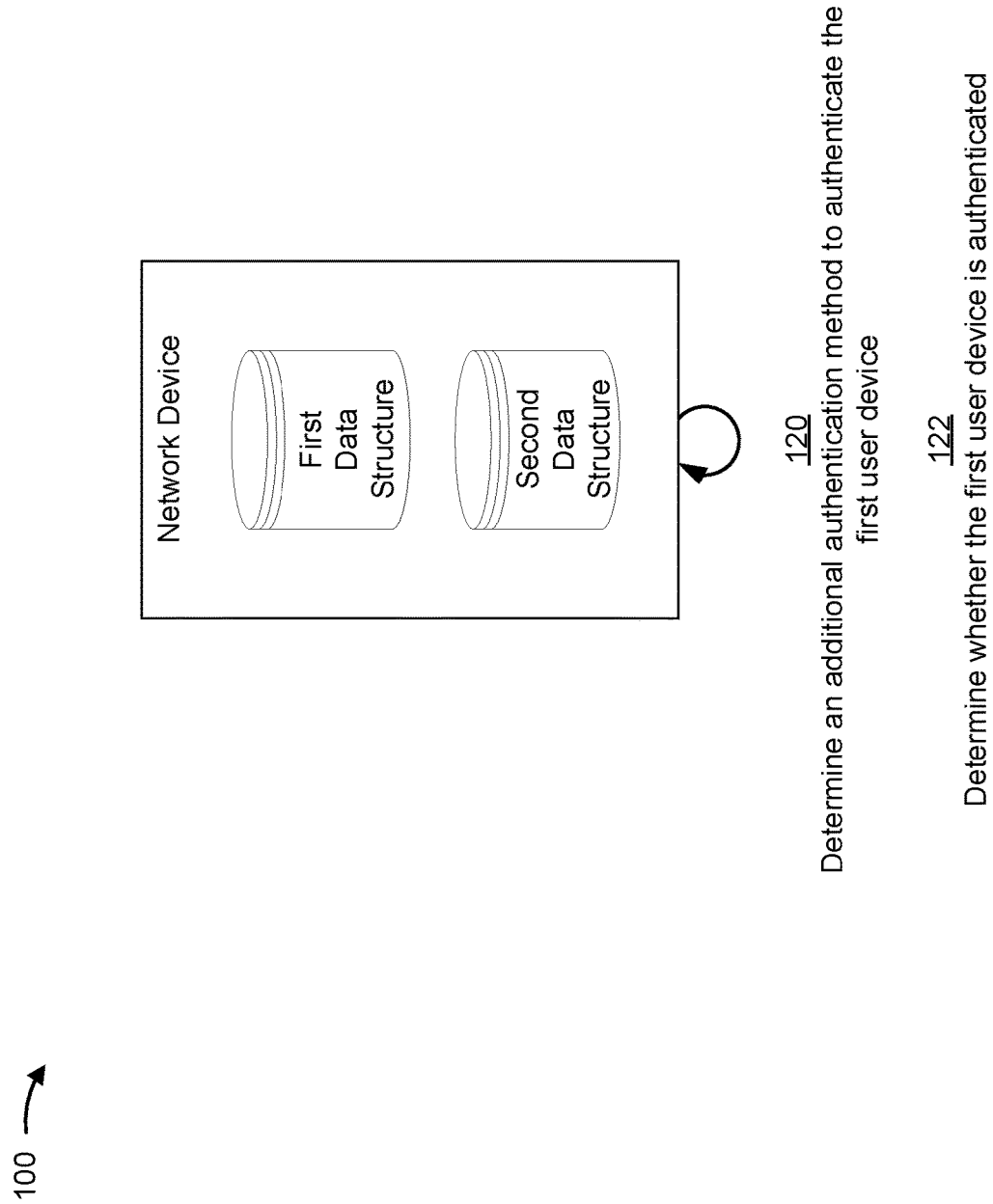
Figure 1F:
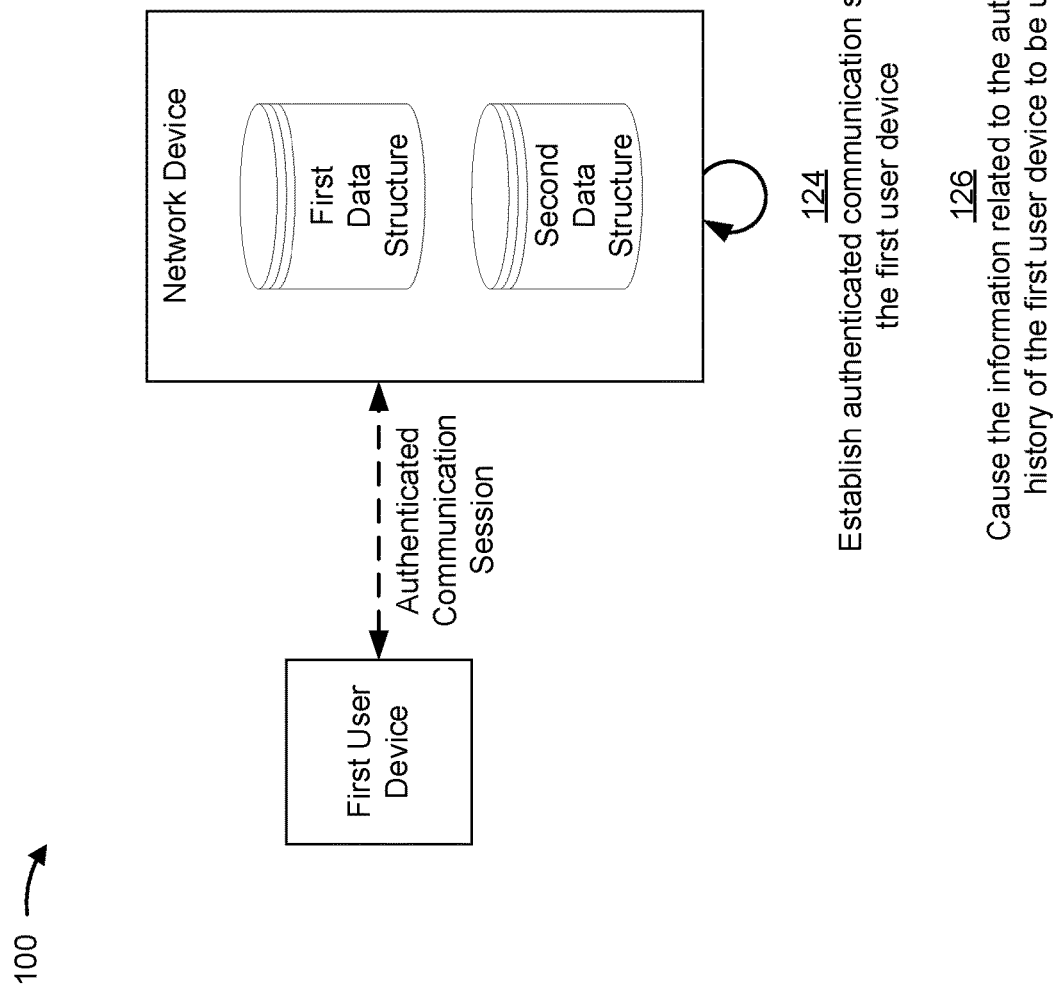

When the network device determines that the first user device is authenticated, the user device may establish an authenticated communication session with the first user device and/or cause the information related to the authentication history of the first user device to be updated, as described herein in relation to FIG. 1F. When the network device determines that the first user device is not authenticated, the network device may reattempt to authenticate the first user device, as described herein in relation to FIG. 1E.

As shown in FIG. 1E and by reference number 120, the network device may determine (e.g., based on determining that the first user device is not authenticated) an additional authentication method to be used by the network device to authenticate the first user device. For example, when the network device has failed to authenticate the first user device using the authentication method that was the previously used authentication method (e.g., identified in the information related to the authentication history of the first user device), the network device may obtain, from the second data structure, information identifying a particular authentication method. The particular authentication method may be different than the authentication method and/or may have a higher rank than other authentication methods in the rank order of one or more authentication methods (e.g., stored by the second data structure). The network device may select the particular authentication method as the additional authentication method to authenticate the user device.

As another example, when the network device has failed to authenticate the first user device using the default authentication method identified by the second data structure, the network device may obtain, from the second data structure, information identifying a secondary authentication method with the next highest rank (e.g., after the rank of the default authentication method) in the rank order of one or more authentication methods. The secondary authentication method may be different than the default authentication method. The network device may select the secondary authentication method as the additional authentication method to be used by the network device to authenticate the user device.

In some implementations, the network device may communicate, based on the additional authentication method, with the first user device and/or the server device to reattempt to authenticate the first user device. For example, based on the additional authentication method, the network device may generate and send an authentication request to the first user device; may receive an authentication response from the first user device; may send the authentication response to the server device; and may receive an authentication acceptance message or authentication rejection message from the server device, in a similar manner as described herein in relation to FIGS. 1C and 1D. Accordingly, as shown by reference number 122, the network device may determine whether the first user device is authenticated in a similar manner as described herein in relation to FIG. 1D and reference number 118. When the network device determines that the first user device is not authenticated, the network device may try again to authenticate the first user device (e.g., by performing processing steps associated with reference numbers 120 and 122 again) or may cease trying to authenticate the first user device. When the network device determines that the first user device is authenticated, the network device may establish an authenticated communication session with the first user device and/or cause the information related to the authentication history of the first user device to be updated, as described herein in relation to FIG. 1F.

As shown in FIG. 1F and by reference number 124, the network device may establish an authenticated communication session with the first user device (e.g., based on determining that the first user device is authenticated) on the single port of the network device. After the authenticated communication session is established, the first user device may communicate with the network device via the single port to access the network.

Additionally, or alternatively, as shown by reference number 126, the network device may cause the information related to the authentication history of the first user device to be updated. For example, the network device may send, to the first data structure, information that identifies the first user device and/or that indicates the authentication method that was successfully used by the network device to authenticate the first user device. The first data structure may update an entry associated with the first user device to indicate the authentication method that was successfully used by the network device to authenticate the first user device as the previously used authentication method that was used to authenticate the first user device.

As shown in FIG. 1G and by reference number 128, the network exposure device may receive an additional connection request from a second user device. The network device may receive the additional connection request from the second user device via the single port of the one or more ports (e.g., via the same port via which the network device received the connection request from the first user device). The network device may receive the additional connection request from the second user device at the same time or at substantially the same time (e.g., within a few millisecond, a few seconds, and/or the like) of receiving the connection request from the first user device. The additional connection request may include information similar to the information in the connection request, such as a MAC address associated with the second user device, an IP address associated with the second user device, a device identifier associated with the second user device, information associated with a user of the second user device, and/or the like.

As shown by reference number 130, the network device may obtain information related to an authentication history of the second user device, in a similar manner as described herein in relation to FIG. 1A and reference number 104. For example, the network device may process (e.g., parse) the additional connection request to determine identification information concerning the second user device, such as the MAC address associated with the second user device, the IP address associated with the second user device, the device identifier associated with the second user device, the information associated with the user of the second user device, and/or the like. The network device may query, based on the identification information, the first data structure for the information related to the authentication history of the second user device. The information related to the authentication history of the second user device may indicate and/or identify whether the network device, or a different device (e.g., a different network device), has previously authenticated the second user device and may indicate and/or identify a previously used authentication method that was used (e.g., by the network device or the different device) to authenticate the second user device.

Figure 1H:
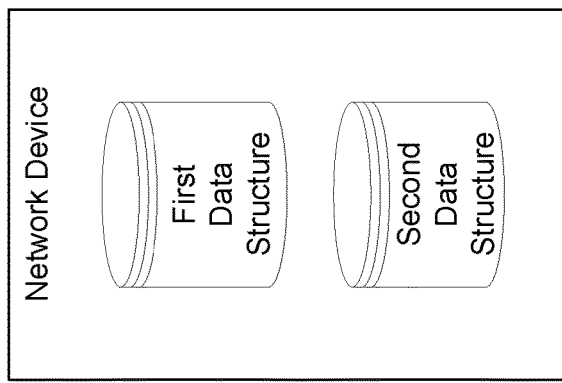

As shown in FIG. 1H and by reference number 132, the network device may determine an authentication method to be used by the network device to authenticate the second user device in a similar manner as described herein in relation to FIG. 1B and reference number 106. For example, the network device may process (e.g., parse) the information related to the authentication history of the second user device to identify and/or determine the previously used authentication method that was used (e.g., by the network device or the different device) to authenticate the second user device. The network device may select the previously used authentication method as the authentication method to be used by the network device to authenticate the first user device. In another example, the network device may process (e.g., parse) the information related to the authentication history of the second user device to identify and/or determine that the network device and/or the different device have not previously authenticated the second user device. The network device therefore may obtain the information identifying the default authentication method from the second data structure. The network device may select the default authentication method as the authentication method to be used by the network device to authenticate the second user device.

In some implementations, the network device may attempt to authenticate, using the authentication method, the second user device in a similar manner as described herein in relation to FIGS. 1C-1E. For example, the network device may generate and send an authentication request to the second user device; may receive an authentication response from the second user device; may send the authentication response to the server device; and may receive an authentication acceptance message or authentication rejection message from the server device. Accordingly, the network device may determine whether the second user device is authenticated. When the network device determines that the second user device is not authenticated (e.g., based on an authentication rejection message received from the server device), the network device may reattempt to authenticate the second user device (e.g., by determining a different authentication method to be used to authenticate the second user device and by communicating with the second user device and the server device based on the different authentication method). As shown by reference number 134, the network device may determine that the second user device is authenticated (e.g., based on an authentication acceptance message received from the server device).

As shown in FIG. 1I and by reference number 136, the network device may establish an authenticated communication session with the second user device (e.g., based on determining that the second user device is authenticated) on the single port of the network device. After the authenticated communication session is established, the second user device may communicate with the network device via the single port to access the network. Additionally, or alternatively, as shown by reference number 138, the network device may cause the information related to the authentication history of the second user device to be updated. For example, the network device may send, to the first data structure, information that identifies the second user device and/or that indicates the authentication method that was successfully used by the network device to authenticate the second user device. The first data structure may update an entry associated with second user device to indicate the authentication method that was successfully used by the network device to authenticate the second user device as the previously used authentication method that was used to authenticate the second user device.

In some implementations, the authentication method used by the network device to authenticate the first user device and the authentication method used to authenticate the second user device are the same. For example, the network device may use a web-based authentication method as the authentication method to authenticate the first user device and as the authentication method to authenticate the second user device. In some implementations, the authentication method used to authenticate the first user device and the authentication method used to authenticate the second user device are different. For example, the network device may use an IEEE 802.1x authentication method as the authentication method to authenticate the first user device and a web-based authentication method to authenticate the second user device. In this way, the network device may support different authentication methods on a single port of the network device to authenticate multiple user devices at the same time or at substantially the same time.

While some implementations described herein concern the network device authenticating the first user device and the second user device via a single port at the same time, additional implementations contemplate the network device authenticating one or more additional user devices in addition to the first user device and the second user device via the single port at the same time. In some implementations, the network device may use the same authentication method to authenticate the first user device, the second user device, and the one or more additional user devices on the same port at the same time. Additionally, or alternatively, the network device may multiple authentication methods to authenticate the first user device, the second user device, and the one or more additional user devices on the same port at the same time.

As indicated above, FIGS. 1A-1I are provided merely as one or more examples. Other examples may differ from what is described with regard to FIGS. 1A-1I.

Figure 2:
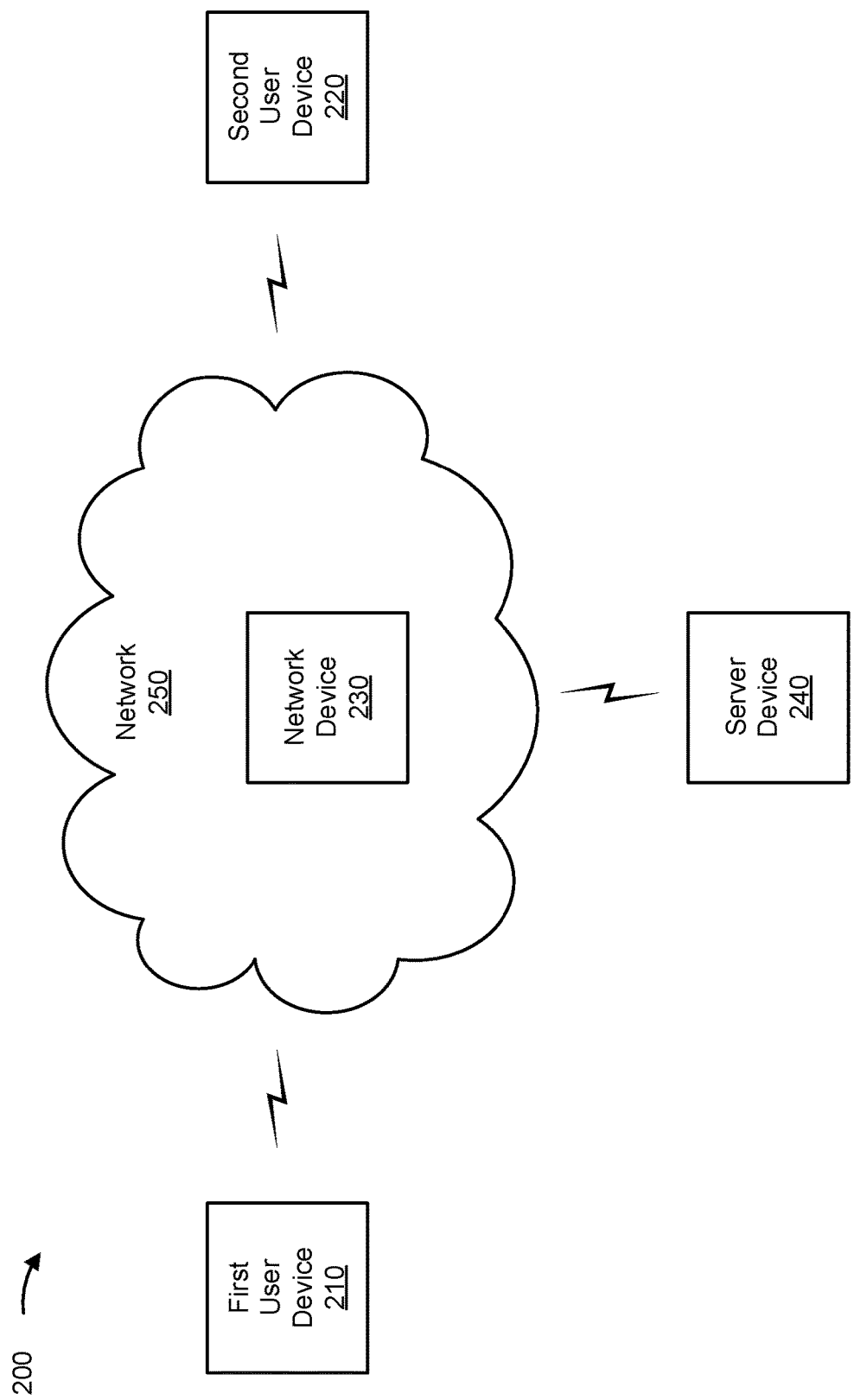
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include first user device 210, second user device 220, network device 230, server device 240, and network 250. Devices of environment 200 may interconnect via wired connections, wireless connections, or a combination of wired and wireless connections.

First user device 210 includes one or more devices capable of receiving, generating, storing, processing, and/or providing information, such as information described herein. For example, first user device 210 may include a computer (e.g., a desktop computer, a laptop computer, a tablet computer, a handheld computer, a server device, and/or the like), a mobile phone (e.g., a smart phone, a radiotelephone, and/or the like), an internet of things (IoT) device or smart appliance, or a similar device. In some implementations, first user device 210 may communicate with network device 230 via a single port, of one or more ports, of the network device 230.

Second user device 220 includes one or more devices capable of receiving, generating, storing, processing, and/or providing information, such as information described herein. For example, second user device 220 may include a computer (e.g., a desktop computer, a laptop computer, a tablet computer, a handheld computer, a server device, and/or the like), a mobile phone (e.g., a smart phone, a radiotelephone, and/or the like), an internet of things (IoT) device or smart appliance, or a similar device. In some implementations, second user device 220 may communicate with network device 230 via a single port, of one or more ports, of the network device 230.

Network device 230 includes one or more devices capable of receiving, storing, generating, processing, forwarding, and/or transferring information in a manner described herein. For example, network device 230 may include a router, a switch, a gateway, a firewall device, a modem, a hub, a bridge, a network interface controller (MC), a reverse proxy, a server (e.g., a proxy server), a multiplexer, a security device, an intrusion detection device, a load balancer, or a similar device. In some implementations, network device 230 may be a physical device implemented within a housing, such as a chassis. In some implementations, network device 230 may be a virtual device implemented by one or more computer devices of a cloud computing environment or a data center. In some implementations, network device 230 may include and/or communicate with one or more data structures and may communicate with server device 240. In some implementations, network device 230 may communicate with first user device 210 and/or second user device 220 via a single port, of one or more ports, of network device 230.

Server device 240 includes one or more devices capable of storing, processing, and/or routing information, such as information described herein. In some implementations, server device 240 may include a communication interface that allows server device 240 to receive information from and/or transmit information to network device 230. In some implementations, server device 240 may be an authentication server device, such as a remote authentication dial in user service (RADIUS) server device or a similar device.

Network 250 includes one or more wired and/or wireless networks. For example, network 250 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
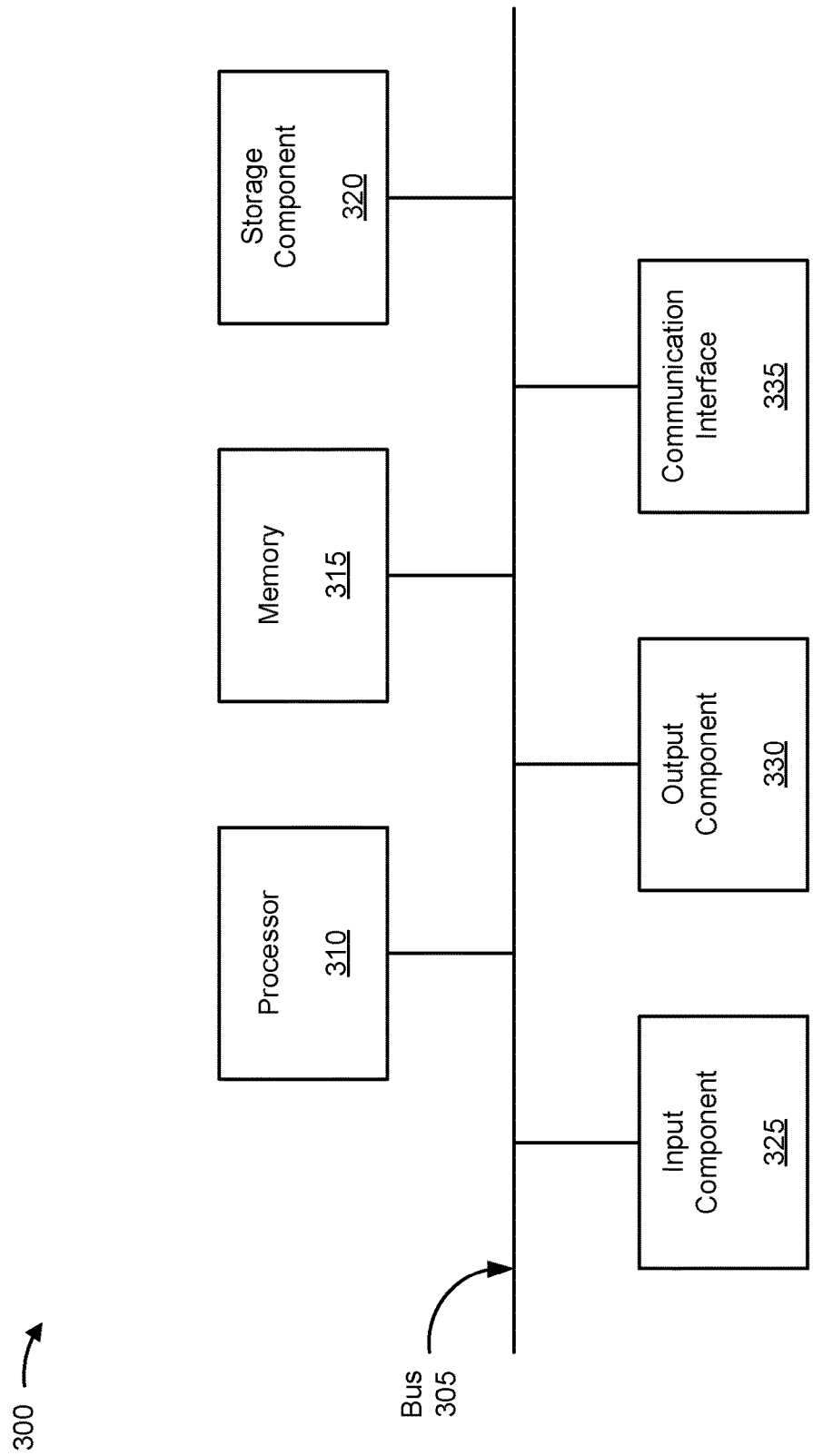
FIGS. 3A and 3B are diagrams of example components of one or more devices of FIG. 2.
Figure 3B:
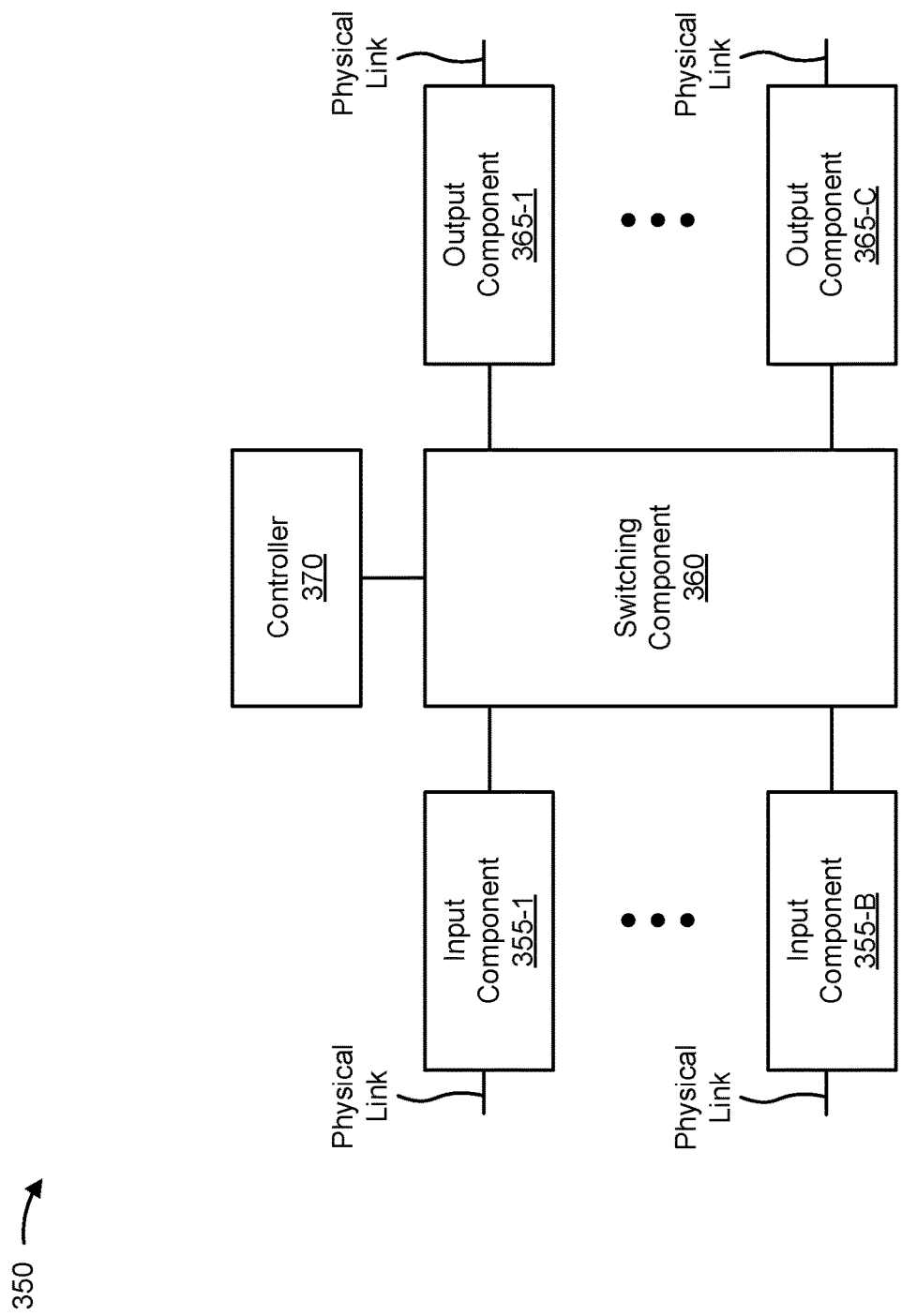

FIGS. 3A-3B are diagrams of example components of one or more devices of FIG. 2. FIG. 3A is a diagram of example components of a device 300. Device 300 may correspond to first user device 210, second user device 220, network device 230, server device 240, and/or the like. In some implementations, first user device 210, second user device 220, network device 230, server device 240, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to first user device 210, second user device 220, network device 230, server device 240, and/or the like. In some implementations, first user device 210, second user device 220, network device 230, server device 240, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
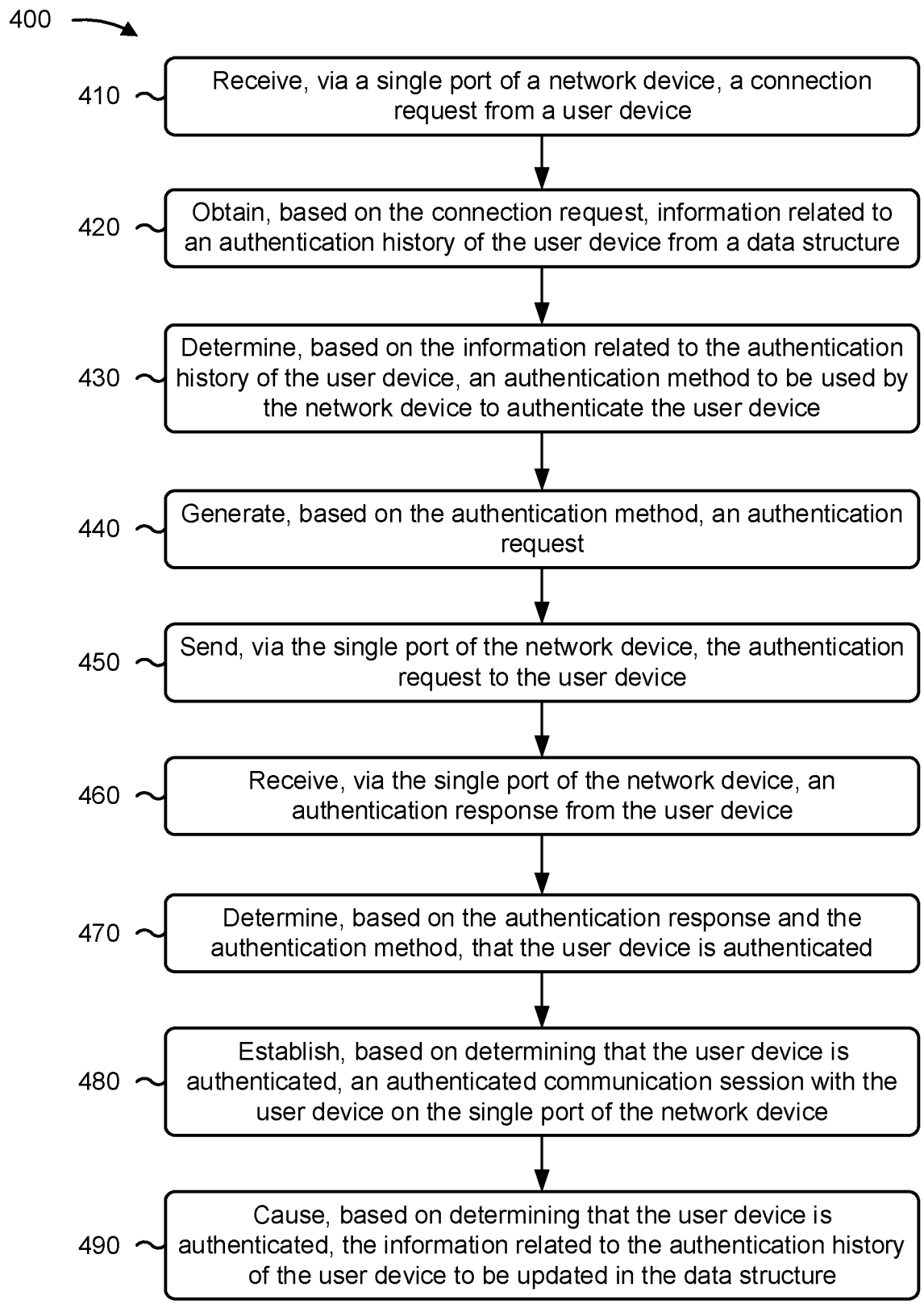
FIGS. 4-6 are flowcharts of example processes for supporting different authentication methods on a port of a network device.

FIG. 4 is a flowchart of an example process 400 for supporting different authentication methods on a port of a network device. In some implementations, one or more process blocks of FIG. 4 may be performed by a network device (e.g., network device 230). In some implementations, one or more process blocks of FIG. 4 may be performed by another device or a group of devices separate from or including the network device, such as another network device, and/or the like.

As shown in FIG. 4, process 400 may include receiving, via a single port of a network device, a connection request from a user device (block 410). For example, the network device (e.g., using processor 310, memory 315, storage component 320, input component 325, output component 330, communication interface 335, input component 355, switching component 360, output component 365, controller 370, and/or the like) may receive, via a single port of the network device, a connection request from a user device, as described above.

As further shown in FIG. 4, process 400 may include obtaining, based on the connection request, information related to an authentication history of the user device from a data structure (block 420). For example, the network device (e.g., using processor 310, memory 315, storage component 320, input component 325, output component 330, communication interface 335, input component 355, switching component 360, output component 365, controller 370, and/or the like) may obtain, based on the connection request, information related to an authentication history of the user device from a data structure, as described above.

As further shown in FIG. 4, process 400 may include determining, based on the information related to the authentication history of the user device, an authentication method to be used by the network device to authenticate the user device (block 430). For example, the network device (e.g., using processor 310, memory 315, storage component 320, input component 325, output component 330, communication interface 335, input component 355, switching component 360, output component 365, controller 370, and/or the like) may determine, based on the information related to the authentication history of the user device, an authentication method to be used by the network device to authenticate the user device, as described above.

As further shown in FIG. 4, process 400 may include generating, based on the authentication method, an authentication request (block 440). For example, the network device (e.g., using processor 310, memory 315, storage component 320, input component 325, output component 330, communication interface 335, input component 355, switching component 360, output component 365, controller 370, and/or the like) may generate, based on the authentication method, an authentication request, as described above.

As further shown in FIG. 4, process 400 may include sending, via the single port of the network device, the authentication request to the user device (block 450). For example, the network device (e.g., using processor 310, memory 315, storage component 320, input component 325, output component 330, communication interface 335, input component 355, switching component 360, output component 365, controller 370, and/or the like) may send, via the single port of the network device, the authentication request to the user device, as described above.

As further shown in FIG. 4, process 400 may include receiving, via the single port of the network device, an authentication response from the user device (block 460). For example, the network device (e.g., using processor 310, memory 315, storage component 320, input component 325, output component 330, communication interface 335, input component 355, switching component 360, output component 365, controller 370, and/or the like) may receive, via the single port of the network device, an authentication response from the user device, as described above.

As further shown in FIG. 4, process 400 may include determining, based on the authentication response and the authentication method, that the user device is authenticated (block 470). For example, the network device (e.g., using processor 310, memory 315, storage component 320, input component 325, output component 330, communication interface 335, input component 355, switching component 360, output component 365, controller 370, and/or the like) may determine, based on the authentication response and the authentication method, that the user device is authenticated, as described above.

As further shown in FIG. 4, process 400 may include establishing, based on determining that the user device is authenticated, an authenticated communication session with the user device on the single port of the network device (block 480). For example, the network device (e.g., using processor 310, memory 315, storage component 320, input component 325, output component 330, communication interface 335, input component 355, switching component 360, output component 365, controller 370, and/or the like) may establish, based on determining that the user device is authenticated, an authenticated communication session with the user device on the single port of the network device, as described above.

As further shown in FIG. 4, process 400 may include causing, based on determining that the user device is authenticated, the information related to the authentication history of the user device to be updated in the data structure (block 490). For example, the network device (e.g., using processor 310, memory 315, storage component 320, input component 325, output component 330, communication interface 335, input component 355, switching component 360, output component 365, controller 370, and/or the like) may cause, based on determining that the user device is authenticated, the information related to the authentication history of the user device to be updated in the data structure, as described above.

Process 400 may include additional implementations, such as any single implementation or any combination of implementations described below and/or in connection with one or more other processes described elsewhere herein.

In a first implementation, process 400 includes receiving, via the single port of the network device, an additional connection request from an additional user device; obtaining, based on the additional connection request, information related to an authentication history of the additional user device from the data structure; determining, based on the information related to the authentication history of the additional user device, an additional authentication method to be used by the network device to authenticate the additional user device, wherein the additional authentication method and the authentication method are different; communicating, via the single port of the network device and based on the additional authentication method, with the additional user device to determine that the additional user device is authenticated; establishing, based on determining that the additional user device is authenticated, an additional authenticated communication session with the additional user device on the single port of the network device; and causing, based on determining that the additional user device is authenticated, the information related to the authentication history of the additional user device to be updated in the data structure.

In a second implementation, alone or in combination with the first implementation, the connection request includes a media access control (MAC) address associated with the user device, an internet protocol (IP) address associated with the user device, a device identifier associated with the user device, or information associated with a user of the user device.

In a third implementation, alone or in combination with one or more of the first and second implementations, determining the authentication method to be used by the network device to authenticate the user device comprises: determining, based on the information related to the authentication history of the user device, a previously used authentication method that was used by the network device to authenticate the user device, and selecting the previously used authentication method as the authentication method to be used by the network device to authenticate the user device.

In a fourth implementation, alone or in combination with one or more of the first through third implementations, determining the authentication method to be used by the network device to authenticate the user device comprises: determining, based on the information related to the authentication history of the user device, that the network device has not previously authenticated the user device; obtaining, based on determining that the network device has not previously authenticated the user device, information identifying a default authentication method from a second data structure; and selecting the default authentication method as the authentication method to be used by the network device to authenticate the user device.

In a fifth implementation, alone or in combination with one or more of the first through fourth implementations, the authentication method is a web-based authentication method and the authentication request is a captive portal authentication request.

In a sixth implementation, alone or in combination with one or more of the first through fifth implementations, the authentication method is an Institute of Electrical and Electronics Engineers (IEEE) 802.1x authentication method and the authentication request is an extensible authentication protocol over local area network (EAPoL) request.

In a seventh implementation, alone or in combination with one or more of the first through sixth implementations, determining that the user device is authenticated comprises: sending the authentication response to a server device; receiving an authentication acceptance message from the server device; and determining, based on the authentication acceptance message, that the user device is authenticated.

In an eighth implementation, alone or in combination with one or more of the first through seventh implementations, causing the information related to the authentication history of the user device to be updated and stored in the data structure comprises sending, to the data structure, information that identifies the user device and indicates the authentication method.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
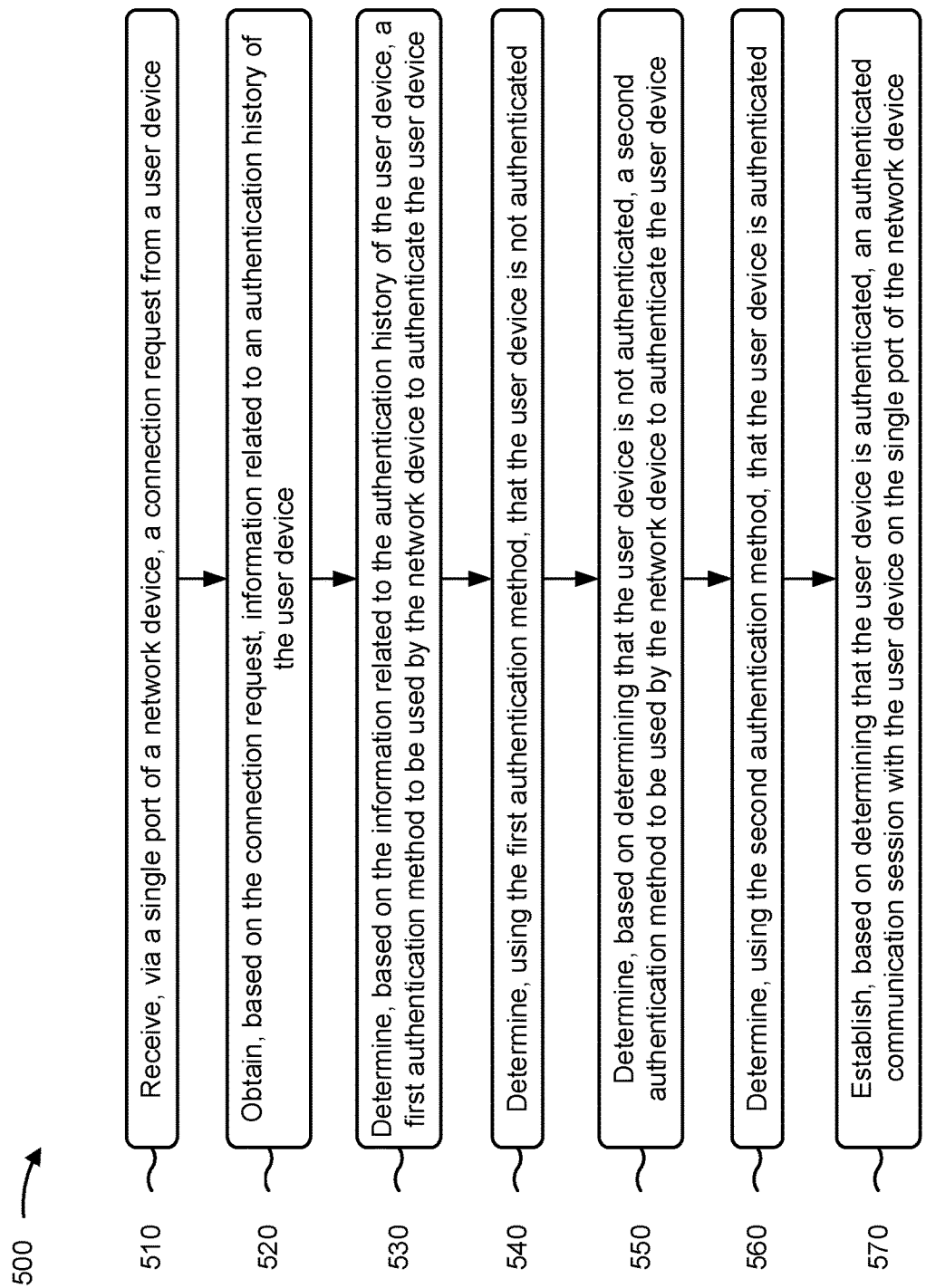

FIG. 5 is a flowchart of an example process 500 for supporting different authentication methods on a port of a network device. In some implementations, one or more process blocks of FIG. 5 may be performed by a network device (e.g., network device 230). In some implementations, one or more process blocks of FIG. 5 may be performed by another device or a group of devices separate from or including the network device, such as another network device, and/or the like.

As shown in FIG. 5, process 500 may include receiving, via a single port of a network device, a connection request from a user device (block 510). For example, the network device (e.g., using processor 310, memory 315, storage component 320, input component 325, output component 330, communication interface 335, input component 355, switching component 360, output component 365, controller 370, and/or the like) may receive, via a single port of the network device, a connection request from a user device, as described above.

As further shown in FIG. 5, process 500 may include obtaining, based on the connection request, information related to an authentication history of the user device (block 520). For example, the network device (e.g., using processor 310, memory 315, storage component 320, input component 325, output component 330, communication interface 335, input component 355, switching component 360, output component 365, controller 370, and/or the like) may obtain, based on the connection request, information related to an authentication history of the user device, as described above.

As further shown in FIG. 5, process 500 may include determining, based on the information related to the authentication history of the user device, a first authentication method to be used by the network device to authenticate the user device (block 530). For example, the network device (e.g., using processor 310, memory 315, storage component 320, input component 325, output component 330, communication interface 335, input component 355, switching component 360, output component 365, controller 370, and/or the like) may determine, based on the information related to the authentication history of the user device, a first authentication method to be used by the network device to authenticate the user device, as described above.

As further shown in FIG. 5, process 500 may include determining, using the first authentication method, that the user device is not authenticated (block 540). For example, the network device (e.g., using processor 310, memory 315, storage component 320, input component 325, output component 330, communication interface 335, input component 355, switching component 360, output component 365, controller 370, and/or the like) may determine, using the first authentication method, that the user device is not authenticated, as described above.

As further shown in FIG. 5, process 500 may include determining, based on determining that the user device is not authenticated, a second authentication method to be used by the network device to authenticate the user device (block 550). For example, the network device (e.g., using processor 310, memory 315, storage component 320, input component 325, output component 330, communication interface 335, input component 355, switching component 360, output component 365, controller 370, and/or the like) may determine, based on determining that the user device is not authenticated, a second authentication method to be used by the network device to authenticate the user device, as described above.

As further shown in FIG. 5, process 500 may include determining, using the second authentication method, that the user device is authenticated (block 560). For example, the network device (e.g., using processor 310, memory 315, storage component 320, input component 325, output component 330, communication interface 335, input component 355, switching component 360, output component 365, controller 370, and/or the like) may determine, using the second authentication method, that the user device is authenticated, as described above.

As further shown in FIG. 5, process 500 may include establishing, based on determining that the user device is authenticated, an authenticated communication session with the user device on the single port of the network device (block 570). For example, the network device (e.g., using processor 310, memory 315, storage component 320, input component 325, output component 330, communication interface 335, input component 355, switching component 360, output component 365, controller 370, and/or the like) may establish, based on determining that the user device is authenticated, an authenticated communication session with the user device on the single port of the network device, as described above.

Process 500 may include additional implementations, such as any single implementation or any combination of implementations described below and/or in connection with one or more other processes described elsewhere herein.

In a first implementation, process 500 further includes receiving, via the single port of the network device, an additional connection request from an additional user device; obtaining, based on the additional connection request, information related to an authentication history of the additional user device; determining, based on the information related to the authentication history of the additional user device, that the second authentication method is to be used by the network device to authenticate the additional user device; determining, using the second authentication method, that the additional user device is not authenticated; determining, based on determining that the additional user device is not authenticated, that the first authentication method is to be used by the network device to authenticate the additional user device; determining, using the first authentication method, that the additional user device is authenticated; and establishing, based on determining that the additional user device is authenticated, an additional authenticated communication session with the additional user device on the single port of the network device.

In a second implementation, alone or in combination with the first implementation, the first authentication method is a web-based authentication method and the second authentication method is an Institute of Electrical and Electronics Engineers (IEEE) 802.1x authentication method.

In a third implementation, alone or in combination with one or more of the first and second implementations, the information related to the authentication history of the user device identifies a previously used authentication method that was used by the network device to determine that the user device was authenticated.

In a fourth implementation, alone or in combination with one or more of the first through third implementations, when determining the first authentication method that can be used by the network device to authenticate the user device, process 500 includes identifying, based on the information related to the authentication history of the user device, a previously used authentication method that was used to authenticate the user device and selecting the previously used authentication method as the first authentication method to be used by the network device to authenticate the user device.

In a fifth implementation, alone or in combination with one or more of the first through fourth implementations, when determining the first authentication method that can be used by the network device to authenticate the user device, process 500 includes determining, based on the information related to the authentication history of the user device, that the user device has not previously been authenticated; obtaining, by the network device and based on determining that the user device has not previously been authenticated, information identifying an initial authentication method; and selecting the initial authentication method as the first authentication method to be used by the network device to authenticate the user device.

In a sixth implementation, alone or in combination with one or more of the first through fifth implementations, when determining the second authentication method that can be used by the network device to authenticate the user device, process 500 includes obtaining, by the network device and based on determining that the user device is not authenticated using the first authentication method, information identifying an additional authentication method, wherein the additional authentication method is different than the first authentication method, and selecting the additional authentication method as the second authentication method to be used by the network device to authenticate the user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
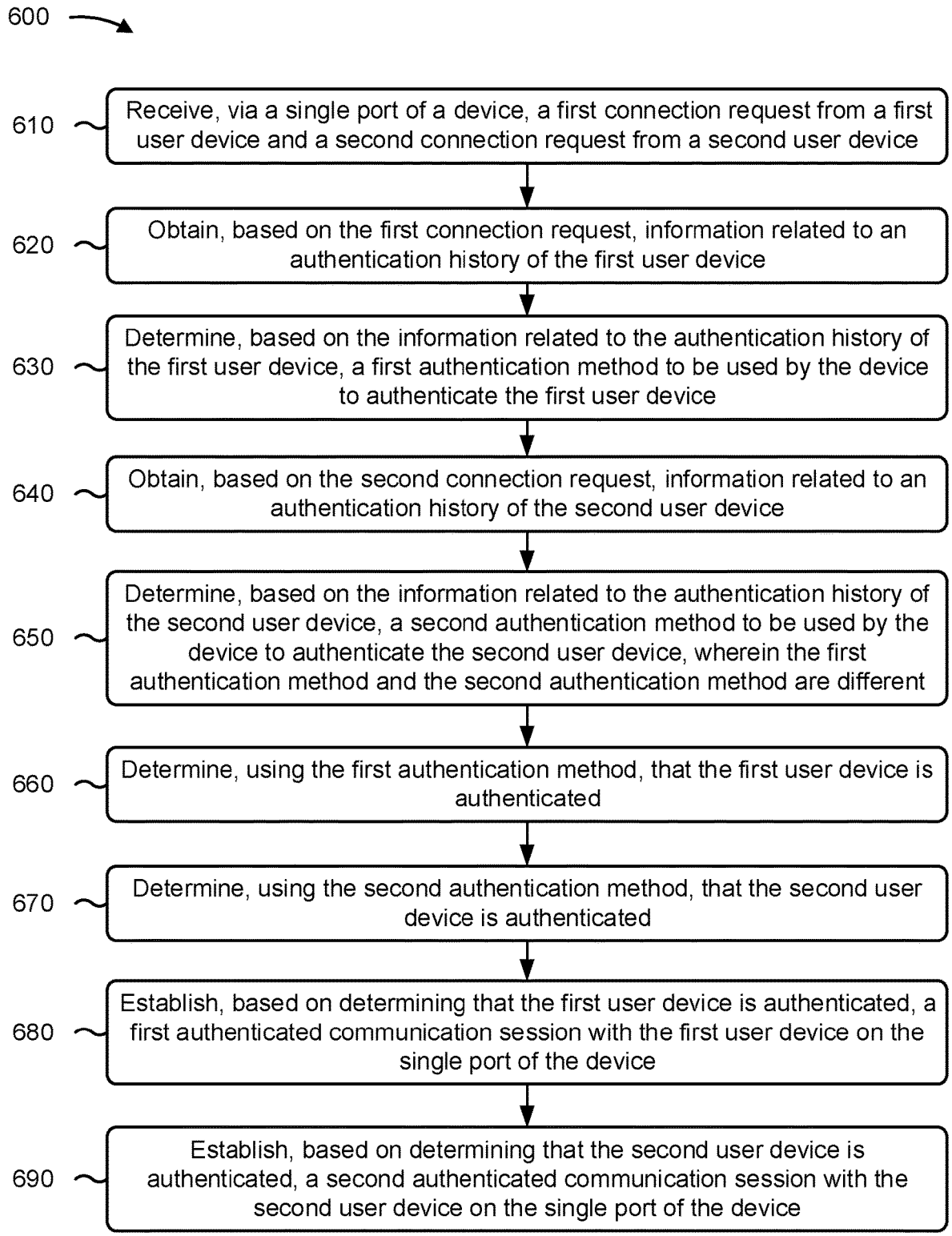

FIG. 6 is a flowchart of an example process 600 for supporting different authentication methods on a port of a network device. In some implementations, one or more process blocks of FIG. 4 may be performed by a device (e.g., network device 230). In some implementations, one or more process blocks of FIG. 4 may be performed by another device or a group of devices separate from or including the device, such as another device, and/or the like.

As shown in FIG. 6, process 600 may include receiving, via a single port of a device, a first connection request from a first user device and a second connection request from a second user device (block 610). For example, the device (e.g., using processor 310, memory 315, storage component 320, input component 325, output component 330, communication interface 335, input component 355, switching component 360, output component 365, controller 370, and/or the like) may receive, via a single port of the device, a first connection request from a first user device and a second connection request from a second user device, as described above.

As further shown in FIG. 6, process 600 may include obtaining, based on the first connection request, information related to an authentication history of the first user device (block 620). For example, the device (e.g., using processor 310, memory 315, storage component 320, input component 325, output component 330, communication interface 335, input component 355, switching component 360, output component 365, controller 370, and/or the like) may obtain, based on the first connection request, information related to an authentication history of the first user device, as described above.

As further shown in FIG. 6, process 600 may include determining, based on the information related to the authentication history of the first user device, a first authentication method to be used by the device to authenticate the first user device (block 630). For example, the device (e.g., using processor 310, memory 315, storage component 320, input component 325, output component 330, communication interface 335, input component 355, switching component 360, output component 365, controller 370, and/or the like) may determine, based on the information related to the authentication history of the first user device, a first authentication method to be used by the device to authenticate the first user device, as described above.

As further shown in FIG. 6, process 600 may include obtaining, based on the second connection request, information related to an authentication history of the second user device (block 640). For example, the device (e.g., using processor 310, memory 315, storage component 320, input component 325, output component 330, communication interface 335, input component 355, switching component 360, output component 365, controller 370, and/or the like) may obtain, based on the second connection request, information related to an authentication history of the second user device, as described above.

As further shown in FIG. 6, process 600 may include determining, based on the information related to the authentication history of the second user device, a second authentication method to be used by the device to authenticate the second user device, wherein the first authentication method and the second authentication method are different (block 650). For example, the device (e.g., using processor 310, memory 315, storage component 320, input component 325, output component 330, communication interface 335, input component 355, switching component 360, output component 365, controller 370, and/or the like) may determine, based on the information related to the authentication history of the second user device, a second authentication method to be used by the device to authenticate the second user device, as described above. In some implementations, the first authentication method and the second authentication method are different.

As further shown in FIG. 6, process 600 may include determining, using the first authentication method, that the first user device is authenticated (block 660). For example, the device (e.g., using processor 310, memory 315, storage component 320, input component 325, output component 330, communication interface 335, input component 355, switching component 360, output component 365, controller 370, and/or the like) may determine, using the first authentication method, that the first user device is authenticated, as described above.

As further shown in FIG. 6, process 600 may include determining, using the second authentication method, that the second user device is authenticated (block 670). For example, the device (e.g., using processor 310, memory 315, storage component 320, input component 325, output component 330, communication interface 335, input component 355, switching component 360, output component 365, controller 370, and/or the like) may determine, using the second authentication method, that the second user device is authenticated, as described above.

As further shown in FIG. 6, process 600 may include establishing, based on determining that the first user device is authenticated, a first authenticated communication session with the first user device on the single port of the device (block 680). For example, the device (e.g., using processor 310, memory 315, storage component 320, input component 325, output component 330, communication interface 335, input component 355, switching component 360, output component 365, controller 370, and/or the like) may establish, based on determining that the first user device is authenticated, a first authenticated communication session with the first user device on the single port of the device, as described above.

As further shown in FIG. 6, process 600 may include establishing, based on determining that the second user device is authenticated, a second authenticated communication session with the second user device on the single port of the device (block 690). For example, the device (e.g., using processor 310, memory 315, storage component 320, input component 325, output component 330, communication interface 335, input component 355, switching component 360, output component 365, controller 370, and/or the like) may establish, based on determining that the second user device is authenticated, a second authenticated communication session with the second user device on the single port of the device, as described above.

Process 600 may include additional implementations, such as any single implementation or any combination of implementations described below and/or in connection with one or more other processes described elsewhere herein.

In a first implementation, when determining the first authentication method to be used by the device to authenticate the first user device, process 600 includes determining the first authentication method based on an authentication method identified in the information related to the authentication history of the first user device.

In a second implementation, alone or in combination with the first implementation, when determining the second authentication method to be used by the device to authenticate the second user device, process 600 includes determining that the information related to the authentication history of the second user device does not indicate an authentication method; obtaining information identifying a particular authentication method of the device for authenticating user devices; and selecting the particular authentication method as the second authentication method.

In a third implementation, alone or in combination with one or more of the first and second implementations, process 600 further includes updating the information related to the authentication history of the first user device to indicate that the first user device was authenticated using the first authentication method and updating the information related to the authentication history of the second user device to indicate that the second user device was authenticated using the second authentication method.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device and via a single port of the network device, a connection request from a user device;
   obtaining, by the network device and based on the connection request, information related to an authentication history of the user device from a first data structure,
      wherein the first data structure stores information that indicates whether the network device has previously authenticated the user device and information that indicates whether an authentication method was previously used to authenticate the user device;
   determining, by the network device and based on the information related to the authentication history of the user device, the authentication method to be used by the network device to authenticate the user device,
      wherein determining the authentication method to be used by the network device to authenticate the user device comprises:
         determining, based on the information related to the authentication history of the user device, that the network device has not previously authenticated the user device;
         obtaining, by the network device and based on determining that the network device has not previously authenticated the user device, information identifying a default authentication method from a second data structure,
            wherein the second data structure stores the information identifying the default authentication method; and
         selecting the default authentication method as the authentication method to be used by the network device to authenticate the user device;
   generating, by the network device and based on the authentication method, an authentication request;
   sending, by the network device and via the single port of the network device, the authentication request to the user device;
   receiving, by the network device and via the single port of the network device, an authentication response from the user device;
   determining, by the network device and based on the authentication response and the authentication method, that the user device is authenticated;
   establishing, by the network device and based on determining that the user device is authenticated, an authenticated communication session with the user device on the single port of the network device; and
   causing, by the network device and based on determining that the user device is authenticated, the information related to the authentication history of the user device to be updated in the first data structure.

2. The method of claim 1, further comprising:
   receiving, via the single port of the network device, an additional connection request from an additional user device;
   obtaining, based on the additional connection request, information related to an authentication history of the additional user device from the first data structure;
   determining, based on the information related to the authentication history of the additional user device, an additional authentication method to be used by the network device to authenticate the additional user device, wherein the additional authentication method and the authentication method are different;

communicating, via the single port of the network device and based on the additional authentication method, with the additional user device to determine that the additional user device is authenticated;

establishing, based on determining that the additional user device is authenticated, an additional authenticated communication session with the additional user device on the single port of the network device; and causing, based on determining that the additional user device is authenticated, the information related to the authentication history of the additional user device to be updated in the first data structure.

3. The method of claim 1, wherein the connection request includes a media access control (MAC) address associated with the user device, an internet protocol (IP) address associated with the user device, a device identifier associated with the user device, or information associated with a user of the user device.

4. The method of claim 2, wherein determining the additional authentication method to be used by the network device to authenticate the additional user device comprises:

determining, based on the information related to the authentication history of the additional user device, a previously used authentication method that was used by the network device to authenticate the additional user device; and selecting the previously used authentication method as the additional authentication method to be used by the network device to authenticate the additional user device.

5. The method of claim 1,
wherein the authentication method is one or more of:
a web-based authentication method, or
a MAC-based authentication method.

6. The method of claim 1, wherein the authentication method is a web-based authentication method and the authentication request is a captive portal authentication request.

7. The method of claim 1, wherein the authentication method is an Institute of Electrical and Electronics Engineers (IEEE) 802.1x authentication method and the authentication request is an extensible authentication protocol over local area network (EAPoL) request.

8. The method of claim 1, wherein determining that the user device is authenticated comprises:
sending the authentication response to a server device;
receiving an authentication acceptance message from the server device; and
determining, based on the authentication acceptance message, that the user device is authenticated.

9. The method of claim 1, wherein causing the information related to the authentication history of the user device to be updated and stored in the first data structure comprises:
sending, to the first data structure, information that identifies the user device and indicates the authentication method.

10. A network device, comprising:
a first data structure,
wherein the first data structure stores information related to authentication histories associated with a plurality of user devices;
a second data structure,
wherein the second data structure stores information related to a default authentication method;

one or more memories; and
one or more processors to:
receive, via a single port of the network device, a connection request from a user device of the plurality of user devices;
obtain, based on the connection request, information related to an authentication history, of the authentication histories, of the user device;
determine, based on the information related to the authentication history of the user device, a first authentication method to be used by the network device to authenticate the user device;
determine, using the first authentication method, that the user device is not authenticated;
determine, based on determining that the user device is not authenticated, a second authentication method to be used by the network device to authenticate the user device from the second data structure;
determine, using the second authentication method, that the user device is authenticated; and
establish, based on determining that the user device is authenticated, an authenticated communication session with the user device on the single port of the network device.

11. The network device of claim 10, wherein the one or more processors are further to:
receive, via the single port of the network device, an additional connection request from an additional user device;
obtain, based on the additional connection request, information related to an authentication history of the additional user device;
determine, based on the information related to the authentication history of the additional user device, that the second authentication method is to be used by the network device to authenticate the additional user device;
determine, using the second authentication method, that the additional user device is not authenticated;
determine, based on determining that the additional user device is not authenticated, that the first authentication method is to be used by the network device to authenticate the additional user device;
determine, using the first authentication method, that the additional user device is authenticated; and
establish, based on determining that the additional user device is authenticated, an additional authenticated communication session with the additional user device on the single port of the network device.

12. The network device of claim 10, wherein the first authentication method is a web-based authentication method and the second authentication method is an Institute of Electrical and Electronics Engineers (IEEE) 802.1x authentication method.

13. The network device of claim 10, wherein the information related to the authentication history of the user device identifies a previously used authentication method that was used by the network device to determine that the user device was authenticated.

14. The network device of claim 10, wherein the one or more processors, when determining the first authentication method that can be used by the network device to authenticate the user device, are to:
identify, based on the information related to the authentication history of the user device, a previously used authentication method that was used to authenticate the user device; and select the previously used authentication method as the first authentication method to be used by the network device to authenticate the user device.

15. The network device of claim 10, wherein the one or more processors, when determining the first authentication method that can be used by the network device to authenticate the user device, are to:
    determine, based on the information related to the authentication history of the user device, that the user device has not previously been authenticated;
    obtain, by the network device and based on determining that the user device has not previously been authenticated, information identifying an initial authentication method; and
    select the initial authentication method as the first authentication method to be used by the network device to authenticate the user device.

16. The network device of claim 10, wherein the one or more processors, when determining the second authentication method to be used by the network device to authenticate the user device, are to:
    obtain, by the network device and based on determining that the user device is not authenticated using the first authentication method, information identifying an additional authentication method,
        wherein the additional authentication method is different than the first authentication method; and
    select the additional authentication method as the second authentication method to be used by the network device to authenticate the user device.

17. A non-transitory computer-readable medium storing instructions, the instructions comprising:
    one or more instructions that, when executed by one or more processors of a device, cause the one or more processors to:
        receive, via a single port of the device, a first connection request from a first user device and a second connection request from a second user device;
        obtain, based on the first connection request, information related to an authentication history of the first user device;
        determine, based on the information related to the authentication history of the first user device stored in a first data structure, a first authentication method to be used by the device to authenticate the first user device,
            wherein the first data structure stores information that indicates whether the device has previously authenticated the first user device and information that indicates whether the first authentication method was previously used to authenticate the first user device;
        obtain, based on the second connection request, information related to an authentication history of the second user device;
        determine, based on the information related to the authentication history of the second user device stored in a second data structure, a second authentication method to be used by the device to authenticate the second user device,
            wherein the first authentication method and the second authentication method are different;
        determine, using the first authentication method, that the first user device is authenticated;
        determine, using the second authentication method, that the second user device is authenticated;
        establish, based on determining that the first user device is authenticated, a first authenticated communication session with the first user device on the single port of the device; and
        establish, based on determining that the second user device is authenticated, a second authenticated communication session with the second user device on the single port of the device.

18. The non-transitory computer-readable medium of claim 17, wherein the one or more instructions, that cause the one or more processors to determine the first authentication method to be used by the device to authenticate the first user device, cause the one or more processors to:
    determine the first authentication method based on an authentication method identified in the information related to the authentication history of the first user device.

19. The non-transitory computer-readable medium of claim 17, wherein the one or more instructions, that cause the one or more processors to determine the second authentication method to be used by the device to authenticate the second user device, cause the one or more processors to:
    determine that the information related to the authentication history of the second user device does not indicate an authentication method;
    obtain information identifying a particular authentication method of the device for authenticating user devices in the second data structure,
        wherein the particular authentication method is a default authentication method; and
    select the particular authentication method as the second authentication method.

20. The non-transitory computer-readable medium of claim 17, wherein the one or more instructions, when executed by the one or more processors, further cause the one or more processors to:
    update the information related to the authentication history of the first user device to indicate that the first user device was authenticated using the first authentication method; and
    update the information related to the authentication history of the second user device to indicate that the second user device was authenticated using the second authentication method.

* * * * *